(12) United States Patent
Harel (10) Patent No.: US 10,813,000 B2
(45) Date of Patent: Oct. 20, 2020

(54) CHANNEL-BASED REMOTE UNIT MONITORING AND OPTIMIZATION IN A WIRELESS COMMUNICATIONS SYSTEM (WCS)

(71) Applicant: Corning Optical Communications LLC, Charlotte, NC (US)

(72) Inventor: Dror Harel, Hod Hasharon (IL)

(73) Assignee: Corning Optical Communications LLC, Charlotte, NC (US)

( * ) Notice: Subject to any disclaimer, the term of this patent is extended or adjusted under 35 U.S.C. 154(b) by 98 days.

(21) Appl. No.: 16/123,287

(22) Filed: Sep. 6, 2018

(65) Prior Publication Data

US 2020/0084649 A1 Mar. 12, 2020

(51) Int. Cl.
*H04W 24/10* (2009.01)
*H04B 17/336* (2015.01)
*H04B 17/318* (2015.01)
*H04B 17/345* (2015.01)

(52) U.S. Cl.
CPC .......... *H04W 24/10* (2013.01); *H04B 17/318* (2015.01); *H04B 17/336* (2015.01); *H04B 17/345* (2015.01)

(58) Field of Classification Search
CPC .............................. H04W 24/10; H04W 84/08
USPC ........................................................ 370/328
See application file for complete search history.

(56) References Cited

U.S. PATENT DOCUMENTS

| 10,181,906 B1* | 1/2019 | Harel | H04B 10/2942 |
| 2006/0264182 A1* | 11/2006 | Morioka | H04B 1/0483 455/78 |
| 2011/0124333 A1* | 5/2011 | Lotze | H04W 16/14 455/434 |
| 2017/0150317 A1 | 5/2017 | Iun et al. | |

* cited by examiner

*Primary Examiner* — Angel T Brockman
(74) *Attorney, Agent, or Firm* — C. Keith Montgomery (57) ABSTRACT

Channel-based remote unit monitoring and optimization in a wireless communications system (WCS) is described herein. A remote unit control circuit receives a number of communications signals each uniquely associated with a signal channel and a remote unit communicating on the signal channel. The communications signals are received by the remote unit control circuit before being recombined based on signal sources. The communications signals may be analyzed to determine key performance indicators (KPIs) for a selected signal channel (s) and/or a selected remote unit (s). The KPIs may be used to optimize performance of the WCS on a per signal channel and/or per remote unit basis. By employing the remote unit control circuit to determining the KPIs based on a selected signal channel (s) and/or a selected remote unit (s), it is possible to support channel-based remote unit monitoring and optimization in the WCS, thus helping to provide optimized user experience in the WCS.

18 Claims, 6 Drawing Sheets

300

RECEIVE A PLURALITY OF COMMUNICATIONS SIGNALS (204(1)-204(N)) EACH CORRESPONDING TO A SIGNAL CHANNEL AND A REMOTE UNIT COMMUNICATING A RESPECTIVE COMMUNICATIONS SIGNAL AMONG THE PLURALITY OF COMMUNICATIONS SIGNALS (204(1)-204(N)) ON THE SIGNAL CHANNEL — 302

RECEIVE AT LEAST ONE PERFORMANCE REPORT (222) CORRESPONDING TO THE AT LEAST ONE SELECTED COMMUNICATIONS SIGNAL (208) AMONG THE PLURALITY OF COMMUNICATIONS SIGNALS (204(1)-204(N)) — 304

PROVIDE THE AT LEAST ONE PERFORMANCE REPORT (222) TO A CONTROL OUTPUT (224) — 306

CHANNEL-BASED REMOTE UNIT MONITORING AND OPTIMIZATION IN A WIRELESS COMMUNICATIONS SYSTEM (WCS)

BACKGROUND

The disclosure relates generally to wireless communications systems (WCSs), such as wireless distributed systems (WDSs), distributed antenna systems (DASs), remote radio head (RRH) systems, and small radio cell systems, and more particularly to supporting channel-based remote unit monitoring and optimization in a WCS.

Wireless customers are increasingly demanding wireless communications services, such as cellular communications services and Wireless Fidelity (WiFi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of WDSs. Examples of WDSs include DASs, RRH systems, and small radio cell systems (e.g., femtocells systems). WDSs include remote units configured to receive and transmit downlink communications signals to client devices within the antenna range of the respective remote units. WDSs can be particularly useful when deployed inside buildings or other indoor environments where the wireless communication devices may not otherwise be able to effectively receive radio frequency (RF) signals from a source.

Figure 1:
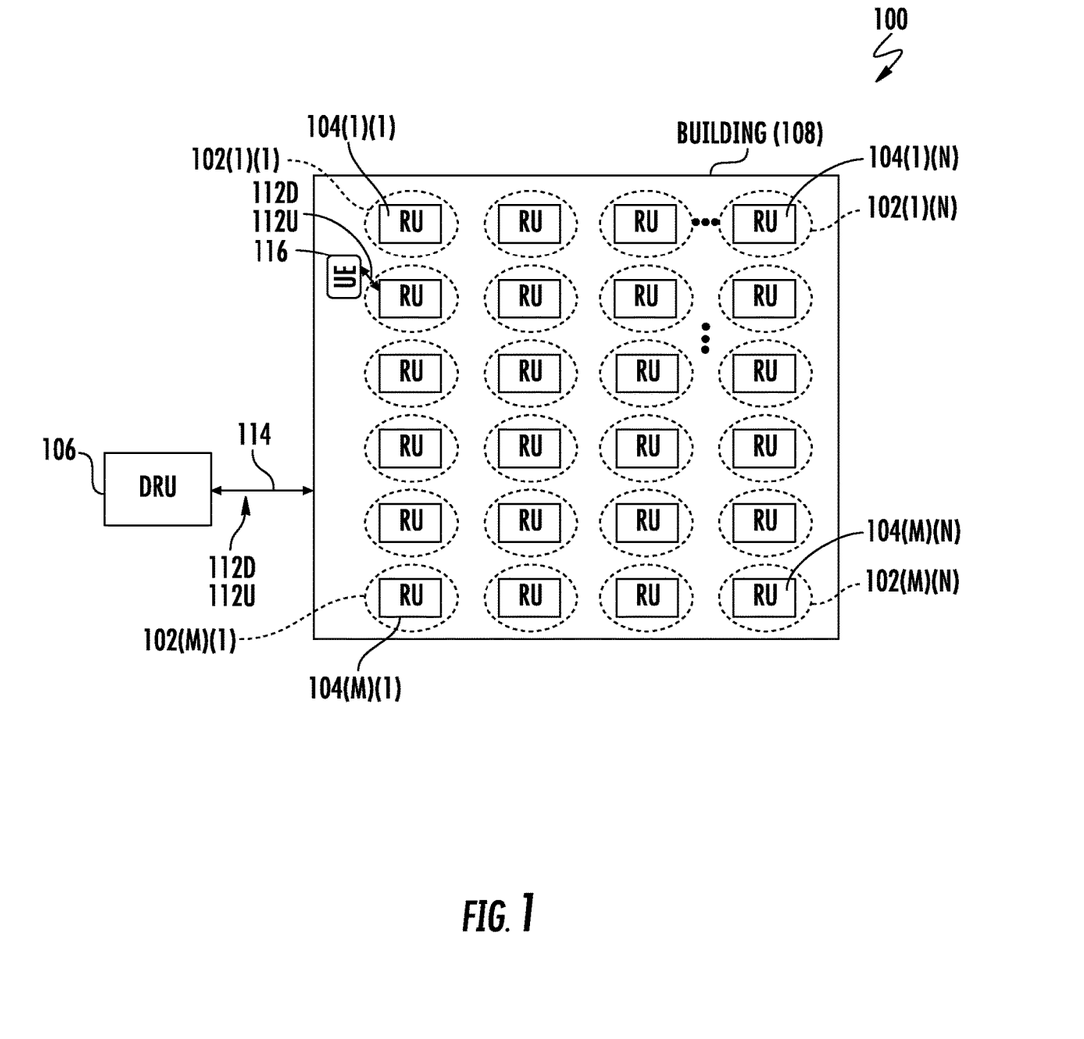
FIG. 1 is a schematic diagram of an exemplary indoor wireless communications system (WCS) that includes an indoor cell neighboring an outdoor cell.

In this regard, FIG. 1 illustrates a wireless communications system (WCS) 100, such as a wireless distribution system (WDS), that is configured to distribute communications services to remote coverage areas 102(1)(1)-102(M)(N), where 'N' is the number of remote coverage areas. The WCS 100 can be configured to support a variety of communications services that can include cellular communications services, wireless communications services, such as RF identification (RFID) tracking, WiFi, local area network (LAN), wireless LAN (WLAN), and wireless solutions (Bluetooth, WiFi Global Positioning System (GPS) signal-based, and others) for location-based services, and combinations thereof, as examples. For example, the WCS 100 may be a DAS or an RRH system. The remote coverage areas 102(1)(1)-102(M)(N) are created by and centered on remote units (RUs) 104(1)(1)-104(M)(N) connected to a digital routing unit (DRU) 106. The remote units 104(1)(1)-104(M)(N) are shown arranged in rows '1-M,' each with columns '1-N' for convenience, and are located in a building 108 or in an area of the building 108. The DRU 106 may be communicatively coupled to a base transceiver station (BTS) or a baseband unit (BBU). The DRU 106 receives downlink communications signals 112D from the BTS and/or the BBU to be communicated to the remote units 104(1)(1)-104(M)(N). The downlink communications signals 112D are communicated by the DRU 106 over a communications link 114 to the remote units 104(1)(1)-104(M)(N). The remote units 104(1)(1)-104(M)(N) are configured to receive the downlink communications signals 112D from the DRU 106 over the communications link 114. The remote units 104(1)(1)-104(M)(N) may include an RF transmitter/receiver (not shown) and a respective antenna operably connected to the RF transmitter/receiver to wirelessly distribute the communications services to user equipment (UE) 116 within their respective remote coverage areas 102(1)(1)-102(M)(N). The remote units 104(1)(1)-104(M)(N) are also configured to receive uplink communications signals 112U from the user equipment 116 in their respective remote coverage areas 102(1)(1)-102(M)(N) to be communicated to the DRU 106.

With continuing reference to FIG. 1, each of the remote units 104(1)(1)-104(M)(N) may receive multiple uplink communications signals 112U in multiple frequency bands. In this regard, each remote unit 104(1)(1)-104(M)(N) may first combine the multiple uplink communications signals 112U into a number of combined uplink communications signals (e.g., based on frequency channels or bands) for transmission to the DRU 106 over the communications link 114. The DRU 106 may split the combined uplink communications signals received from each of the remote units 104(1)(1)-104(M)(N) into individual channel-based uplink communications signals. Subsequently, the DRU 106 may recombine (e.g., based on the frequency bands) a number of channel-based uplink communications signals received from all of the remote units 104(1)(1)-104(M)(N) to generate a recombined channel-based communications signal for distribution to a number of signal sources (e.g., service providers). In this regard, each recombined channel-based communications signal can include a number of channel-based uplink communications signals received from multiple remote units 104(1)(1)-104(M)(N). As such, it may be difficult for the DRU 106 to distinguish the multiple uplink communications signals 112U and/or extract signalization data on a per-channel and per-remote unit basis. As such, the DRU 106 may not be able to determine signal attributes (e.g., power and noise) related to a specific mobile device communicating with a specific remote unit among the remote units 104(1)(1)-104(M)(N), thus making it difficult to optimize performance of the remote units 104(1)(1)-104(M)(N) on a per-channel and per-remote unit basis. Hence, it may be desirable to enable channel-based remote unit monitoring and optimization in the WCS 100.

No admission is made that any reference cited herein constitutes prior art. Applicant expressly reserves the right to challenge the accuracy and pertinency of any cited documents.

SUMMARY

Embodiments of the disclosure relate to channel-based remote unit monitoring and optimization in a wireless communications system (WCS), such as a wireless distribution system (WDS) or a centralized radio access network (RAN). In this regard, a remote unit control circuit is configured to receive a number of communications signals each uniquely associated with a signal channel and a remote unit communicating on the signal channel in the WCS. In examples discussed herein, the communications signals are received by the remote unit control circuit prior to being recombined based on signal sources (e.g., service providers). As such, it may be possible to analyze the communications signals to determine key performance indicators (KPIs) of the WCS relative to a selected signal channel (s) and/or a selected remote unit (s). Accordingly, the KPIs may be used to optimize performance of the WCS on a per signal channel and/or per remote unit basis. By employing the remote unit control circuit to determining the KPIs based on a selected signal channel (s) and/or a selected remote unit (s), it is possible to support channel-based remote unit monitoring and optimization in the WCS, thus helping to provide optimized user experience in the WCS.

In one exemplary aspect, a remote unit control circuit in a WCS is provided. The remote unit control circuit includes a channel selection circuit comprising a signal output communicatively coupled to a signal processing circuit. The channel selection circuit configured to receive a plurality of communications signals each corresponding to a signal channel and a remote unit communicating a respective communications signal among the plurality of communications signals on the signal channel. The remote unit control circuit also includes a control circuit comprising a control output. The control circuit is configured to cause the channel selection circuit to provide at least one selected communications signal among the plurality of communications signals to the signal output. The control circuit is also configured to receive at least one performance report corresponding to the at least one selected communications signal from the signal processing circuit. The control circuit is also configured to provide the at least one performance report to the control output.

An additional embodiment of the disclosure relates to a method for supporting channel-based remote unit monitoring and optimization in a WCS. The method includes receiving a plurality of communications signals each corresponding to a signal channel and a remote unit communicating a respective communications signal among the plurality of communications signals on the signal channel. The method also includes receiving at least one performance report corresponding to at least one selected communications signal among the plurality of communications signals. The method also includes providing the at least one performance report to a control output.

An additional embodiment of the disclosure relates to a WCS. The WCS includes a plurality of remote units. The WCS also includes a digital routing unit (DRU) including a signal routing circuit. The DRU is coupled to the plurality of remote units via a plurality of communications mediums, respectively. The DRU is configured to distribute a plurality of downlink communications signals to the plurality of remote units via the plurality of communications mediums, respectively. The DRU is also configured to receive a plurality of uplink communications signals from the plurality of remote units via the plurality of communications mediums, respectively. The DRU is also configured to generate a plurality of communications signals based on the plurality of uplink communications signals. Each of the plurality of communications signals corresponds to a signal channel and a remote unit among the plurality of remote units communicating on the signal channel. The WCS also includes a signal processing circuit including a signal input and a plurality of cell processing circuits. The WCS also includes a remote unit control circuit. The remote unit control circuit includes a channel selection circuit comprising a signal output communicatively coupled to the signal input of the signal processing circuit. The channel selection circuit is configured to receive the plurality of communications signals. The remote unit control circuit also includes a control circuit including a control output. The control circuit is configured to cause the channel selection circuit to provide at least one selected communications signal among the plurality of communications signals to the signal output. The control circuit is also configured to receive at least one performance report corresponding to the at least one selected communications signal from the signal processing circuit. The control circuit is also configured to provide the at least one performance report to the control output.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment (s), and together with the description serve to explain principles and operation of the various embodiments.

DETAILED DESCRIPTION

Embodiments of the disclosure relate to channel-based remote unit monitoring and optimization in a wireless communications system (WCS), such as a wireless distribution system (WDS) or a centralized radio access network (RAN). In this regard, a remote unit control circuit is configured to receive a number of communications signals each uniquely associated with a signal channel and a remote unit communicating on the signal channel in the WCS. In examples discussed herein, the communications signals are received by the remote unit control circuit prior to being recombined based on signal sources (e.g., service providers). As such, it may be possible to analyze the communications signals to determine key performance indicators (KPIs) of the WCS relative to a selected signal channel (s) and/or a selected remote unit (s). Accordingly, the KPIs may be used to optimize performance of the WCS on a per signal channel and/or per remote unit basis. By employing the remote unit control circuit to determining the KPIs based on a selected signal channel (s) and/or a selected remote unit (s), it is possible to support channel-based remote unit monitoring and optimization in the WCS, thus helping to provide optimized user experience in the WCS.

Figure 2:
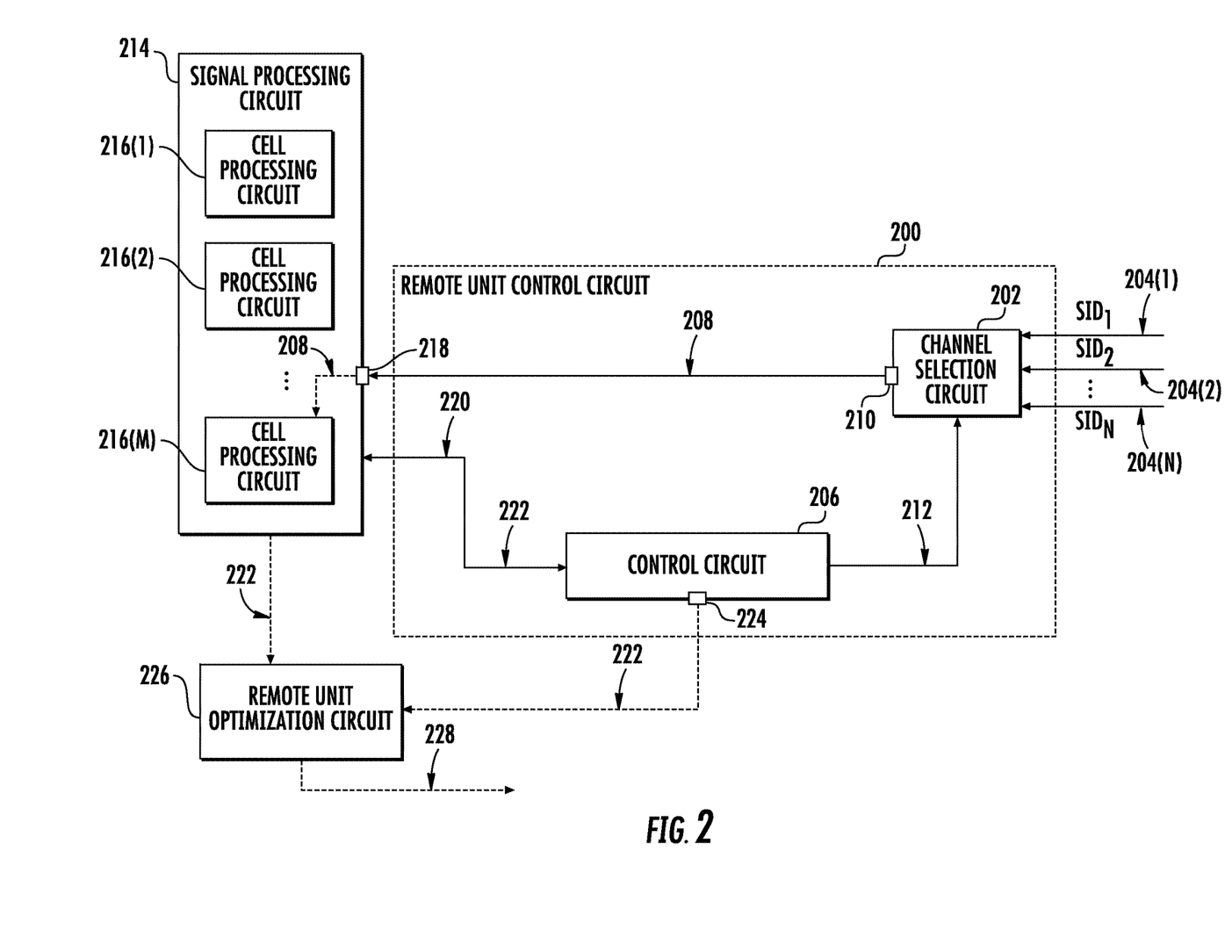
FIG. 2 is a schematic diagram of an exemplary remote unit control circuit configured to enable channel-based remote unit monitoring and optimization in a WCS.

In this regard, FIG. 2 is a schematic diagram of an exemplary remote unit control circuit 200 configured to enable channel-based remote unit monitoring and optimization in a WCS. The remote unit control circuit 200 includes a channel selection circuit 202 configured to receive a plurality of communications signals 204(1)-204(N). In a non-limiting example, the communications signals 204(1)-204(N) are associated with a plurality of signal identifiers $SID_1$-$SID_N$, respectively. Each of the signal identifiers $SID_1$-$SID_N$ may include a signal channel identifier and a remote unit identifier, as shown below, to uniquely identify a signal channel and a remote unit communicating on the signal channel.

Signal Identifier ($SID_1$-$SID_N$)

| Signal Channel Identifier | Remote Unit Identifier |
| --- | --- |

The remote unit control circuit 200 includes a control circuit 206, which can be a microprocessor, a microcontroller, a field-programmable gate array (FPGA), or a combination therein. The remote unit control circuit 200 is configured to cause the channel selection circuit 202 to provide at least one selected communications signal 208 among the communications signals 204(1)-204(N) to a signal output 210 of the channel selection circuit 202. Notably, the selected communications signal 208 is associated with at least one selected signal identifier among the signal identifiers $SID_1$-$SID_N$.

In one non-limiting example, the selected communications signal 208 can be a subset of the communications signals 204(1)-204(N) as determined by the control circuit 206. In another non-limiting example, the control circuit 206 can cause the channel selection circuit 202 to provide each of the communications signals 204(1)-204(N) (e.g., in a sequential order) to the signal output 210 as the selected communications signal 208. The control circuit 206 may control the channel selection circuit 202 via a first control signal 212.

The remote unit control circuit 200 is communicatively coupled to a signal processing circuit 214, which includes a plurality of cell processing circuits 216(1)-216(M). As further discussed later in FIG. 4, the cell processing circuits 216(1)-216(M) may be configured to communicate downlink and uplink communications signals with a plurality of signal sources (e.g., service providers), respectively. In a non-limiting example, the cell processing circuits 216(1)-216(M) can be enabled by at least one application specific integrated circuit (ASIC). In this regard, the cell processing circuits 216(1)-216(M) may be provided as a number of discrete ASICs or integrated into a single ASIC. The signal processing circuit 214 may include a signal input 218 communicatively coupled to the signal output 210 of the channel selection circuit 202. Notably, the phrase "communicatively coupled" is used hereinafter to indicate either direct coupling (e.g., via conductive wire) or indirect coupling (e.g., via intermediate circuit).

The control circuit 206 may provide a second control signal 220 to the signal processing circuit 214. The second control signal 220 causes the signal processing circuit 214 to couple a selected cell processing circuit (e.g., the cell processing circuit 216(M)) among the cell processing circuits 216(1)-216(M) to the signal input 218 to receive the selected communications signal 208 from the signal output 210 of the channel selection circuit 202. It should be appreciated that the control circuit 206 can cause the signal processing circuit 214 to designate one or more of the cell processing circuits 216(1)-216(M) as the selected cell processing circuit. In a non-limiting example, the control circuit 206 can determine whether the selected communications signal 208 includes the signal channel identifier and/or the remote unit identifier. If the selected communications signal 208 does not include the signal channel identifier and/or the remote unit identifier, the control circuit 206 may retrieve such information from internal configuration and provide to the signal processing circuit 214 in the second control signal 220.

The selected cell processing circuit is configured to receive from the signal input 218, the selected communications signal 208, which is associated with at least one selected signal channel and at least one selected remote unit communicating a respective communications signal among the communications signals 204(1)-204(N) on the selected signal channel. The selected cell processing circuit is configured to determine one or more performance attributes corresponding to the selected communications signal 208. In this regard, the selected cell processing circuit can also be referred to as a "sniffing cell processing circuit." In a non-limiting example, the performance attributes can include such key performance indicators (KPIs) as signal strength, channel bandwidth, physical resource block (PRB) utilization, noise level, signal to noise ratio (SNR), user equipment (UE) identification, and UE channel information, and so on. In a non-limiting example, a PRB corresponds to an orthogonal frequency division multiplexing (OFDM) time-frequency grid occupying a number of consecutive OFDM symbols in a time domain and a number of consecutive subcarriers in a frequency domain. For example, a PRB as defined by the third-generation partnership project (3GPP) can correspond to one-half millisecond (0.5 ms) in the time domain and 180 KHz bandwidth in the frequency domain. In this regard, the PRB is a minimum unit for allocating resources to users. Accordingly, the selected cell processing circuit provides at least one performance report 222, which includes the determined attributes corresponding to the selected communications signal 208, to the control circuit 206. The selected cell processing circuit may also add into the performance report 222 at least one selected location information of the selected remote unit that is associated with the selected communications signal 208. For example, the selected communications signal 208 is associated with at least one selected signal identifier, which includes at least one selected remote unit identifier according to the discussions above. As such, the selected cell processing circuit may identify the selected location information of the selected remote unit based on the selected remote unit identifier. The selected cell processing circuit may also receive selected location information of the selected remote unit from, for example, the control circuit 206. In a non-limiting example, the signal processing circuit 214 and/or the control circuit 206 can maintain a remote unit location table that correlates remote unit identifiers with respective locations. The control circuit 206 can in turn output the performance report 222 via a control output 224.

The remote unit control circuit 200 may be coupled to a remote unit optimization circuit 226. In a non-limiting example, the remote unit optimization circuit 226 can be an independent circuit or integrated as part of the control circuit 206. The remote unit optimization circuit 226 may receive the performance report 222 via the control output 224. Notably, the remote unit optimization circuit 226 may also receive the performance report 222 directly from the signal processing circuit 214. The remote unit optimization circuit 226 may analyze the KPIs in the performance report 222 to determine whether a remote unit (s) can be optimized. Accordingly, the remote unit optimization circuit 226 may optimize (e.g., reconfigure one or more operating parameters) the remote unit (s) via a third control signal 228. Although it may be desirable to optimize the remote unit (s) through the remote unit optimization circuit 226, it should be appreciated that it may also be possible for the remote unit optimization circuit 226 to optimize the remote unit (s) directly. It should also be appreciated that, although the examples provided herein are related to optimizing the remote unit (s), the remote unit optimization circuit 226 may be further configured to optimize other sub-systems and/or elements in the WCS.

Figure 3:
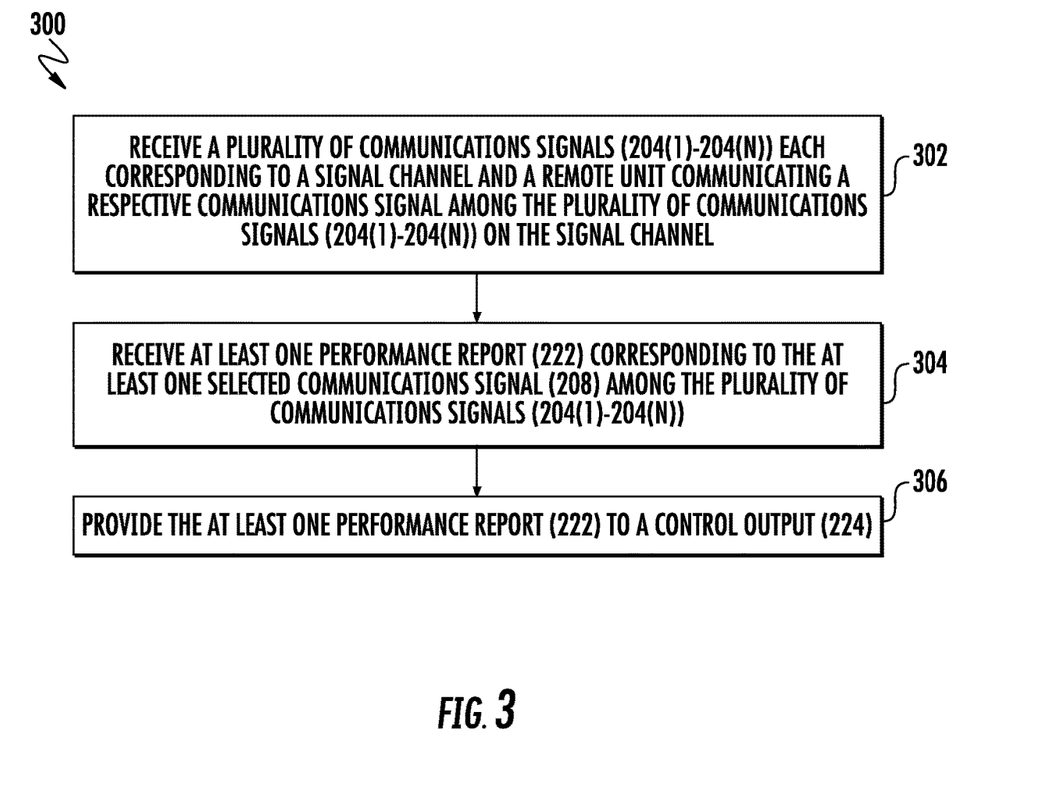
FIG. 3 is a flowchart of an exemplary process that can be employed by the remote unit control circuit of FIG. 2 to enable channel-based remote unit monitoring and optimization in the WCS.

The remote unit control circuit 200 may be configured to support channel-based remote unit monitoring and optimization based on a process. In this regard, FIG. 3 is a flowchart of an exemplary process 300 that can be employed by the remote unit control circuit 200 of FIG. 2 to enable channel-based remote unit monitoring and optimization in a WCS.

According to the process 300, the remote unit control circuit 200 is configured to receive the communications signals 204(1)-204(N) each corresponding to a signal channel and a remote unit communicating a respective communications signal among the communications signals 204(1)-204(N) on the signal channel (block 302). The remote unit control circuit 200 is also configured to receive the performance report 222 that corresponds to the selected communications signal 208 among the communications signals 204(1)-204(N) (block 304). The remote unit control circuit 200 is further configured to provide the performance report 222 to the control output 224 (block 306).

Figure 4:
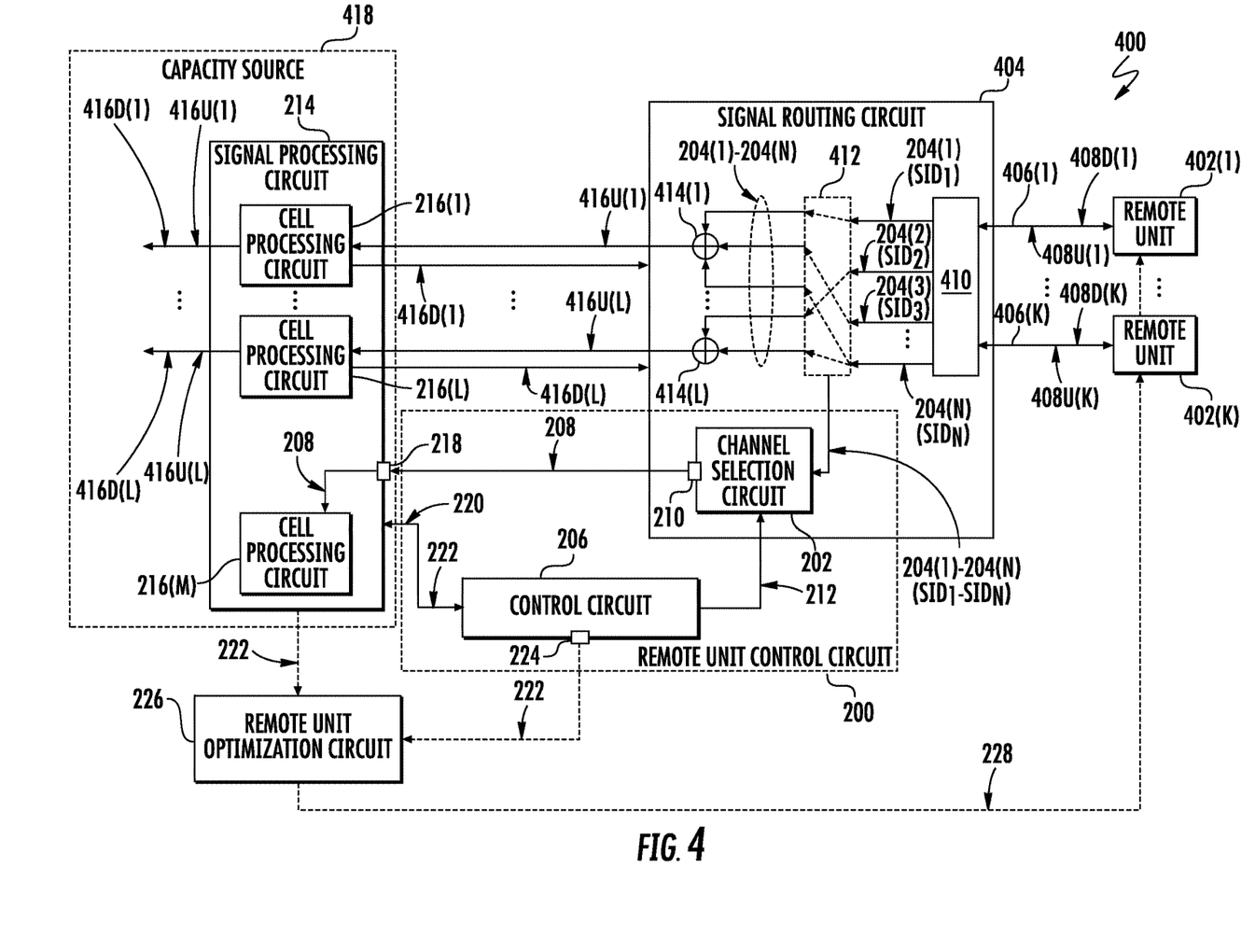
FIG. 4 is a schematic diagram of an exemplary WCS including the remote unit control circuit of FIG. 2 configured to enable channel-based remote unit monitoring and optimization in the WCS according to one embodiment of the present disclosure.

The remote unit control circuit 200 of FIG. 2 can be provided in a WCS to support channel-based remote unit monitoring and optimization. In this regard, FIG. 4 is a schematic diagram of an exemplary WCS 400 including the remote unit control circuit 200 of FIG. 2 configured to enable channel-based remote unit monitoring and optimization in the WCS 400 according to one embodiment of the present disclosure. Common elements between FIGS. 2 and 4 are shown therein with common element numbers and will not be re-described herein.

The WCS 400 includes a plurality of remote units 402(1)-402(K) and a signal routing circuit 404. In a non-limiting example, the signal routing circuit 404 can be configured to function as a digital routing unit (DRU) in the WCS 400. In another non-limiting example, the signal routing circuit 404 can be integrated with a DRU in the WCS 400. The signal routing circuit 404 may be configured to include the channel selection circuit 202. The signal routing circuit 404 is coupled to the remote units 402(1)-402(K) via a plurality of communications mediums 406(1)-406(K), which can be optical fiber based communications mediums, for example. The signal routing circuit 404 is configured to distribute a plurality of downlink communications signals 408D(1)-408D(K) to the remote units 402(1)-402(K) via the communications mediums 406(1)-406(K), respectively. The signal routing circuit 404 is also configured to receive a plurality of uplink communications signals 408U(1)-408U(K) from the remote units 402(1)-402(K) via the communications mediums 406(1)-406(K), respectively. Notably, each of the uplink communications signals 408U(1)-408U(K) may correspond to one or more signal channels (or signal bands).

The signal routing circuit 404 includes a channel separation circuit 410 coupled to the communications mediums 406(1)-406(K). The channel separation circuit 410 is configured to receive and split the uplink communications signals 408U(1)-408U(K) to generate the communications signals 204(1)-204(N). As discussed earlier in FIG. 2, the communications signals 204(1)-204(N) may be associated with the signal identifiers $SID_1$-$SID_N$, respectively. Each of the signal identifiers $SID_1$-$SID_N$ may include a signal channel identifier and a remote unit identifier to uniquely identify a combination of a signal channel and a remote unit among the remote units 402(1)-402(K) that communicates on the signal channel. For example, the remote unit 402(1) communicates the uplink communications signal 408U(1) that includes a first signal channel and a second signal channel. Accordingly, the channel separation circuit 410 generates two communications signals (e.g., communications signals 204(1), 204(2)) among the communications signals 204(1)-204(N) based on the uplink communications signal 408U(1). The communications signal 204(1) may be associated with the signal identifier $SID_1$ that uniquely identifies the first signal channel and the remote unit 402(1). Likewise, communications signal 204(2) may be associated with the signal identifier $SID_2$ that uniquely identifies the second signal channel and the remote unit 402(1).

The signal routing circuit 404 may include a signal distribution circuit 412. The signal distribution circuit 412 is configured to receive and provide the communications signals 204(1)-204(N) to the channel selection circuit 202. It should be appreciated that it may also be possible to configure the channel selection circuit 202 to receive the communications signals 204(1)-204(N) directly from the channel separation circuit 410 without the signal distribution circuit 412.

The signal routing circuit 404 includes a plurality of signal combiners 414(1)-414(L), wherein L≤M. The signal combiners 414(1)-414(L) are communicatively coupled to the cell processing circuits 216(1)-216(L) among the cell processing circuits 216(1)-216(M) in the signal processing circuit 214. The signal combiners 414(1)-414(L) are configured to recombine the communications signals 204(1)-204(N) to generate a plurality of combined uplink communications signals 416U(1)-416U(L), respectively. In this regard, each of the combined uplink communications signals 416U(1)-416U(L) may include one or more of the communications signals 204(1)-204(N) that are associated with one or more of the signal identifiers $SID_1$-$SID_N$. For example, the signal combiner 414(1) can generate the combined uplink communications signal 416U(1) to include the communications signals 204(1), 204(3), and 204(N) that are associated with the signal identifiers $SID_1$, $SID_3$, and $SID_N$, respectively. It should be appreciated that the signal combiners 414(1)-414(L) can be configured to combine the communications signals 204(1)-204(N) based on any suitable criteria without affecting functionality and operational principles of the remote unit control circuit 200.

In this regard, the remote unit control circuit 200 can receive the communications signals 204(1)-204(N) before the communications signals 204(1)-204(N) are recombined into the combined uplink communications signals 416U(1)-416U(L). As such, it may be possible to determine and analyze the communications signals 204(1)-204(N) to determine the KPIs of the WCS 400 on a per signal channel and per remote unit basis. Accordingly, it may also be possible to optimize each of the remote units 402(1)-402(K) based on the determined KPIs. As such, it may be possible to support channel-based remote unit monitoring and optimization in the WCS 400, thus helping to provide optimized user experience in the WCS 400.

The WCS 400 may include a capacity source 418. The capacity source 418 may include the signal processing circuit 214. The capacity source 418 may include a signal source (s), such as digital baseband units (BBUs) and/or base transceiver stations (BTSs), corresponding to a service provider (s), which functions as a capacity source to provide a defined capacity (e.g., bandwidth, throughput, etc.) to the WCS 400. In this regard, the signal combiners 414(1)-414(L) can be configured to generate the combined uplink communications signals 416U(1)-416U(L). In a non-limiting example, the capacity source 418 can be collocated or integrated with a DRU of the WCS 400. In this regard, the remote unit optimization circuit 226 may be further configured to optimize a selected signal source and/or the DRU based on the performance report 222.

The cell processing circuits 216(1)-216(L) are also configured to receive a plurality of combined downlink communications signals 416D(1)-416D(L). The cell processing circuits 216(1)-216(L) are further configured to provide the combined downlink communications signals 416D(1)-416D(L) to the signal routing circuit 404. The signal routing circuit 404 converts the combined downlink communications signals 416D(1)-416D(L) into the downlink communications signals 408D(1)-408D(K) for distribution to the remote units 402(1)-402(N), respectively.

In one embodiment, the cell processing circuit 216(M) in the signal processing circuit 214 may be dedicated to receiving the selected communications signal 208 and generating the performance report 222 based on the selected communications signal 208. In addition, the signal processing circuit 214 also includes the cell processing circuits 216(1)-216(L) configured to communicate the combined downlink communications signals 416D(1)-416D(L) and the combined uplink communications signals 416U(1)-416U(L). In this regard, the control circuit 206 can control the signal processing circuit 214 via the second control signal 220 to cause the signal processing circuit 214 to determine the cell processing circuit 216(M) as the selected cell processing circuit and couple the cell processing circuit 216(M) to the signal input 218 to receive the selected communications signal 208. Accordingly, the cell processing circuit 216(M) generates and provides the performance report 222 to the control circuit 206. Notably, it may also be possible for the signal processing circuit 214 to include more than one dedicated cell processing circuit for generating the performance report 222 based on the selected communications signal 208.

Figure 5:
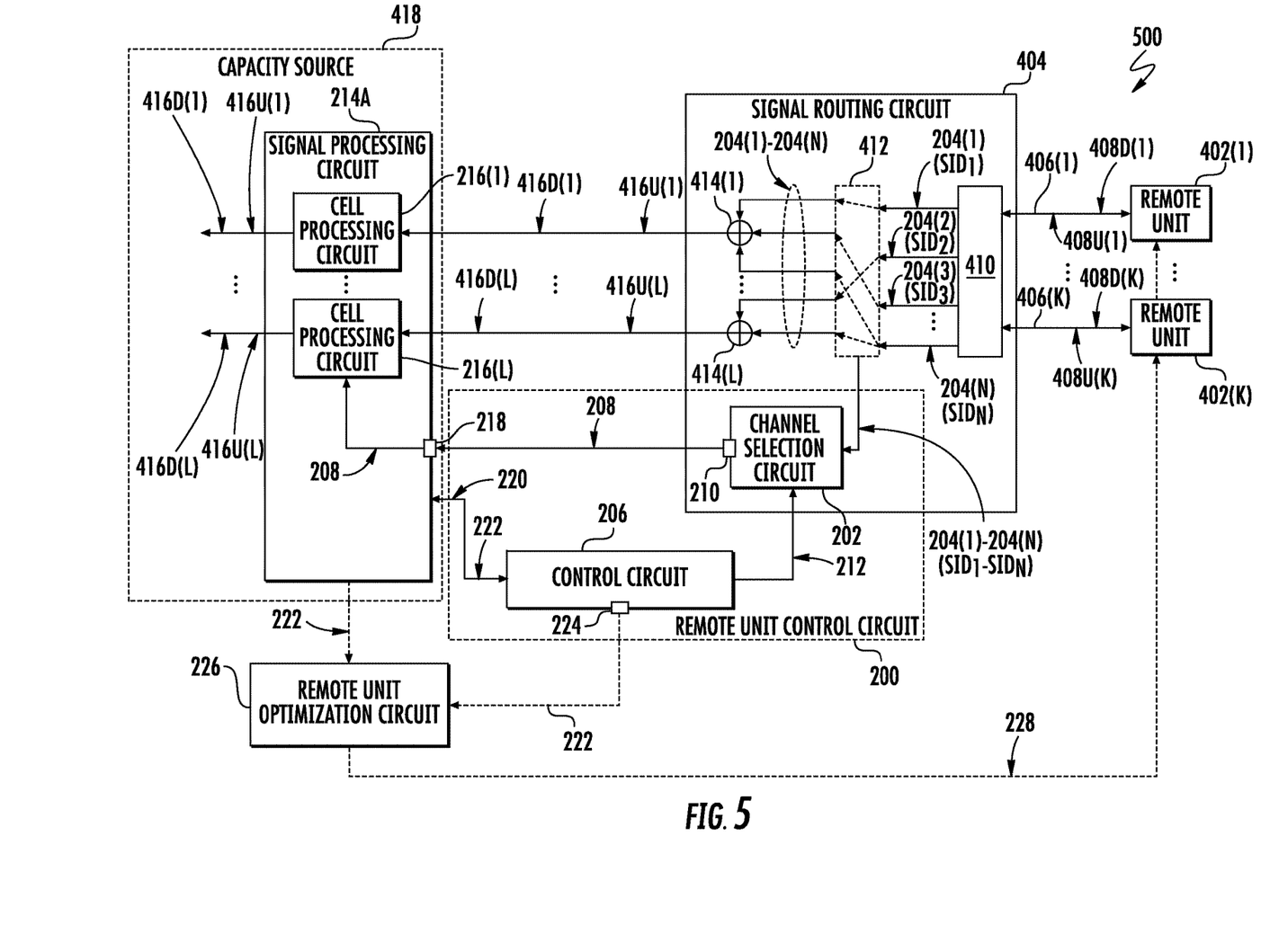
FIG. 5 is a schematic diagram of an exemplary WCS including the remote unit control circuit of FIG. 2 configured to enable channel-based remote unit monitoring and optimization in the WCS according to another embodiment of the present disclosure.

In another embodiment, the signal processing circuit 214 may not include a dedicated cell processing circuit for generating the performance report 222 based on the selected communications signal 208. In this regard, FIG. 5 is a schematic diagram of an exemplary WCS 500 including the remote unit control circuit 200 of FIG. 2 configured to enable channel-based remote unit monitoring and optimization in the WCS 500 according to another embodiment of the present disclosure. Common elements between FIGS. 2, 4, and 5 are shown therein with common element numbers and will not be re-described herein.

The WCS 500 includes a signal processing circuit 214A, which includes the cell processing circuits 216(1)-216(L) that are functionally equivalent to the cell processing circuits 216(1)-216(M) in the signal processing circuit 214 of FIG. 4. Notably, none of the cell processing circuits 216(1)-216(L) is dedicated to generating the performance report 222 based on the selected communications signal 208. In contrast, all of the cell processing circuits 216(1)-216(L) are configured to communicate the combined downlink communications signals 416D(1)-416D(L) and the combined uplink communications signals 416U(1)-416U(L).

In this regard, the control circuit 206 may cause the signal processing circuit 214A to determine one or more of the cell processing circuits 216(1)-216(L) as the selected cell processing circuit for generating the performance report 222 based on the selected communications signal 208. For example, the control circuit 206 can cause the signal processing circuit 214A to determine the selected cell processing circuit as a cell processing circuit having a processing load below a determined load threshold (e.g., during off-peak usage hours) among the cell processing circuits 216(1)-216(L).

In a non-limiting example, the remote unit control circuit 200 of FIGS. 2, 4, and 5 can be provided in an optical fiber-based WCS, such as an optical fiber-based WDS. In this regard, the signal routing circuit 404, which may be configured to function as a DRU in the optical fiber-based WCS, can be configured to receive a plurality of RF downlink communications signals, convert the RF downlink communications signals into a plurality of optical downlink communications signals, respectively, and distribute the optical downlink communications signals to the remote units 402(1)-402(K) via a plurality of optical fiber communications mediums. The signal routing circuit 404 may also receive a plurality of optical uplink communications signals from the remote units 402(1)-402(K) via the optical fiber communications mediums, and convert the optical uplink communications signals into a plurality of RF uplink communications signals. The remote units 402(1)-402(K) may be configured to receive the optical downlink communications signals via the optical fiber communications mediums and convert the optical downlink communications signals into the plurality of RF downlink communications signals. The remote units 402(1)-402(K) may also receive the RF uplink communications signals, convert the RF uplink communications signals into the plurality of optical uplink communications signals, and provide the optical uplink communications signals to the signal routing circuit 404 via the optical fiber communications mediums.

Figure 6:
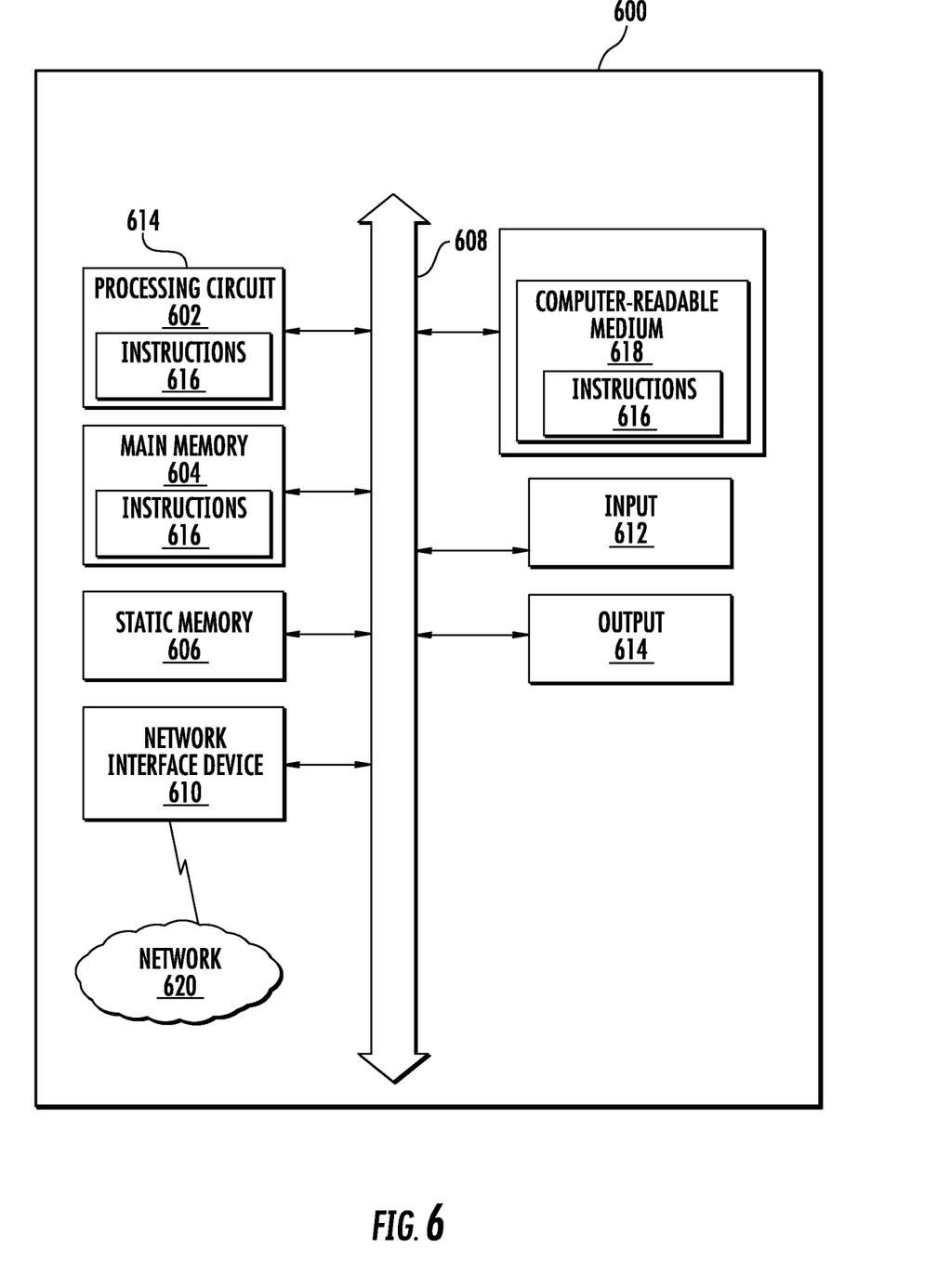
FIG. 6 is a schematic diagram representation of additional detail illustrating a computer system that could be employed in the remote unit control circuit of FIGS. 2, 4, and 5 to support channel-based remote unit monitoring and optimization.

FIG. 6 is a schematic diagram representation of additional detail illustrating a computer system 600 that could be employed in the remote unit control circuit 200 of FIGS. 2, 4, and 5 to support channel-based remote unit monitoring and optimization. In this regard, the computer system 600 is adapted to execute instructions from an exemplary computer-readable medium to perform these and/or any of the functions or processing described herein.

In this regard, the computer system 600 in FIG. 6 may include a set of instructions that may be executed to program and configure programmable digital signal processing circuits in a WCS, such as the WCS 200, 400, and 500 of FIGS. 2, 4, and 5, respectively, for supporting scaling of supported communications services. The computer system 600 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 600 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 600 in this embodiment includes a processing circuit or processor 602, a main memory 604 (e.g., read-only memory (ROM), flash memory, dynamic random access memory (DRAM), such as synchronous DRAM (SDRAM), etc.), and a static memory 606 (e.g., flash memory, static random access memory (SRAM), etc.), which may communicate with each other via a data bus 608. Alternatively, the processor 602 may be connected to the main memory 604 and/or static memory 606 directly or via some other connectivity means. The processor 602 may be a controller, and the main memory 604 or static memory 606 may be any type of memory.

The processor 602 represents one or more general-purpose processing devices, such as a microprocessor, central processing unit, or the like. More particularly, the processor 602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 602 is configured to execute processing logic in instructions for performing the operations and steps discussed herein.

The computer system 600 may further include a network interface device 610. The computer system 600 also may or may not include an input 612, configured to receive input and selections to be communicated to the computer system 600 when executing instructions. The computer system 600 also may or may not include an output 614, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 600 may or may not include a data storage device that includes instructions 616 stored in a computer-readable medium 618. The instructions 616 may also reside, completely or at least partially, within the main memory 604 and/or within the processor 602 during execution thereof by the computer system 600, the main memory 604 and the processor 602 also constituting computer-readable medium. The instructions 616 may further be transmitted or received over a network 620 via the network interface device 610.

While the computer-readable medium 618 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications system (WCS), comprising:
   a plurality of remote units;
   a digital routing unit (DRU) comprising a signal routing circuit, the DRU coupled to the plurality of remote units via a plurality of communications mediums, respectively, and configured to:
   distribute a plurality of downlink communications signals to the plurality of remote units via the plurality of communications mediums, respectively;
   receive a plurality of uplink communications signals from the plurality of remote units via the plurality of communications mediums, respectively; and
   generate a plurality of communications signals based on the plurality of uplink communications signals, wherein each of the plurality of communications signals corresponds to a signal channel and a remote unit among the plurality of remote units communicating on the signal channel;
   a signal processing circuit comprising a signal input and a plurality of cell processing circuits; and
   a remote unit control circuit, comprising:
   a channel selection circuit comprising a signal output communicatively coupled to the signal input of the signal processing circuit, the channel selection circuit configured to receive the plurality of communications signals; and
   a control circuit comprising a control output, the control circuit configured to:
   cause the channel selection circuit to provide at least one selected communications signal among the plurality of communications signals to the signal output;
   receive at least one performance report corresponding to the at least one selected communications signal from the signal processing circuit; and
   provide the at least one performance report to the control output.

2. The WCS of claim 1, wherein the channel selection circuit is provided in the signal routing circuit.

3. The WCS of claim 1, wherein the plurality of communications signals is associated with a plurality of signal identifiers, respectively, each of the plurality of signal identifiers configured to uniquely identify the signal channel and the remote unit communicating a respective communications signal among the plurality of communications signals on the signal channel.

4. The WCS of claim 1, wherein the control circuit is further configured to cause the signal processing circuit to couple a selected cell processing circuit among the plurality of cell processing circuits to the signal input to receive the at least one selected communications signal.

5. The WCS of claim 4, wherein the selected cell processing circuit is configured to:
   receive the at least one selected communications signal from the signal input;
   determine one or more performance attributes corresponding to the at least one selected communications signal;
   generate the at least one performance report comprising the one or more performance attributes; and
   provide the at least one performance report to the control circuit.

6. The WCS of claim 5, wherein the one or more performance attributes comprise at least one key performance indicator (KPI) selected from the group consisting of: signal strength, channel bandwidth, physical resource block (PRB) utilization, noise level, signal to noise ratio (SNR), user equipment (UE) identification, and UE channel information.

7. The WCS of claim 5, wherein the selected cell processing circuit is further configured to:

determine at least one selected location information relating to at least one selected remote unit associated with the at least one selected communications signal; and generate the at least one performance report comprising the at least one selected location information.

8. The WCS of claim 4, wherein the plurality of cell processing circuits is configured to:
receive a plurality of combined downlink communications signals;
provide the plurality of combined downlink communications signals to the signal routing circuit;
receive a plurality of combined uplink communications signals from the signal routing circuit; and
provide the plurality of combined uplink communications signals.

9. The WCS of claim 8, wherein the control circuit is further configured to cause the signal processing circuit to determine the selected cell processing circuit as being a cell processing circuit among the plurality of cell processing circuits dedicated to generating the at least one performance report.

10. The WCS of claim 8, wherein the control circuit is further configured to cause the signal processing circuit to determine the selected cell processing circuit as being a cell processing circuit among the plurality of cell processing circuits having a processing load below a determined load threshold.

11. The WCS of claim 5, wherein the control circuit is further configured to:
provide a first control signal to the channel selection circuit to cause the channel selection circuit to provide the at least one selected communications signal to the signal output; and
provide a second control signal to the signal processing circuit to cause the signal processing circuit to couple the selected cell processing circuit to the signal input to receive the at least one selected communications signal.

12. The WCS of claim 8, wherein the signal routing circuit comprises:
a channel separation circuit configured to:
receive the plurality of uplink communications signals from the plurality of remote units, respectively; and
generate the plurality of communications signals based on the plurality of uplink communications signals;
a signal distribution circuit configured to receive and provide the plurality of communications signals to the channel selection circuit; and
a plurality of signal combiners configured to:
generate the plurality of combined uplink communications signals based on the plurality of communications signals; and
provide the plurality of combined uplink communications signals to the plurality of cell processing circuits.

13. The WCS of claim 1, further comprising a remote unit optimization circuit communicatively coupled to the control output and the plurality of remote units, the remote unit optimization circuit configured to:

receive the at least one performance report from the control output; and
optimize at least one selected remote unit among the plurality of remote units based on the at least one performance report.

14. The WCS of claim 13, wherein the remote unit optimization circuit is further configured to optimize a selected signal source and/or the DRU in the WCS based on the at least one performance report.

15. The WCS of claim 13, wherein the remote unit optimization circuit is further configured to receive the at least one performance report from the signal processing circuit.

16. The WCS of claim 1, wherein the control circuit further comprises a remote unit optimization circuit configured to:
receive the at least one performance report from the control output; and
optimize at least one selected remote unit based on the at least one performance report.

17. The WCS of claim 1 corresponding to a centralized radio access network (RAN).

18. The WDS of claim 1, wherein the DRU is coupled to the plurality of remote units via a plurality of optical fiber communications mediums, respectively, wherein:
the DRU is further configured to:
receive a plurality of radio frequency (RF) downlink communications signals;
convert the plurality of RF downlink communications signals into a plurality of optical downlink communications signals, respectively;
distribute the plurality of optical downlink communications signals to the plurality of remote units via the plurality of optical fiber communications mediums, respectively;
receive a plurality of optical uplink communications signals from the plurality of remote units via the plurality of optical fiber communications mediums, respectively; and
convert the plurality of optical uplink communications signals into a plurality of RF uplink communications signals, respectively; and
the plurality of remote units is further configured to:
receive the plurality of optical downlink communications signals via the plurality of optical fiber communications mediums, respectively;
convert the plurality of optical downlink communications signals into the plurality of RF downlink communications signals, respectively;
receive the plurality of RF uplink communications signals;
convert the plurality of RF uplink communications signals into the plurality of optical uplink communications signals, respectively; and
provide the plurality of optical uplink communications signals to the DRU via the plurality of optical fiber communications mediums, respectively.

* * * * *